Sept. 25, 1923.  1,469,026

J. C. SILVESTER

FILTERING APPARATUS

Filed Jan. 13, 1921  4 Sheets-Sheet 1

Inventor
John C. Silvester

Ch. Parkin
Attorney

Sept. 25, 1923.

J. C. SILVESTER

FILTERING APPARATUS

Filed Jan. 13, 1921  4 Sheets-Sheet 2

1,469,026

Inventor
John C. Silvester
By
Attorney

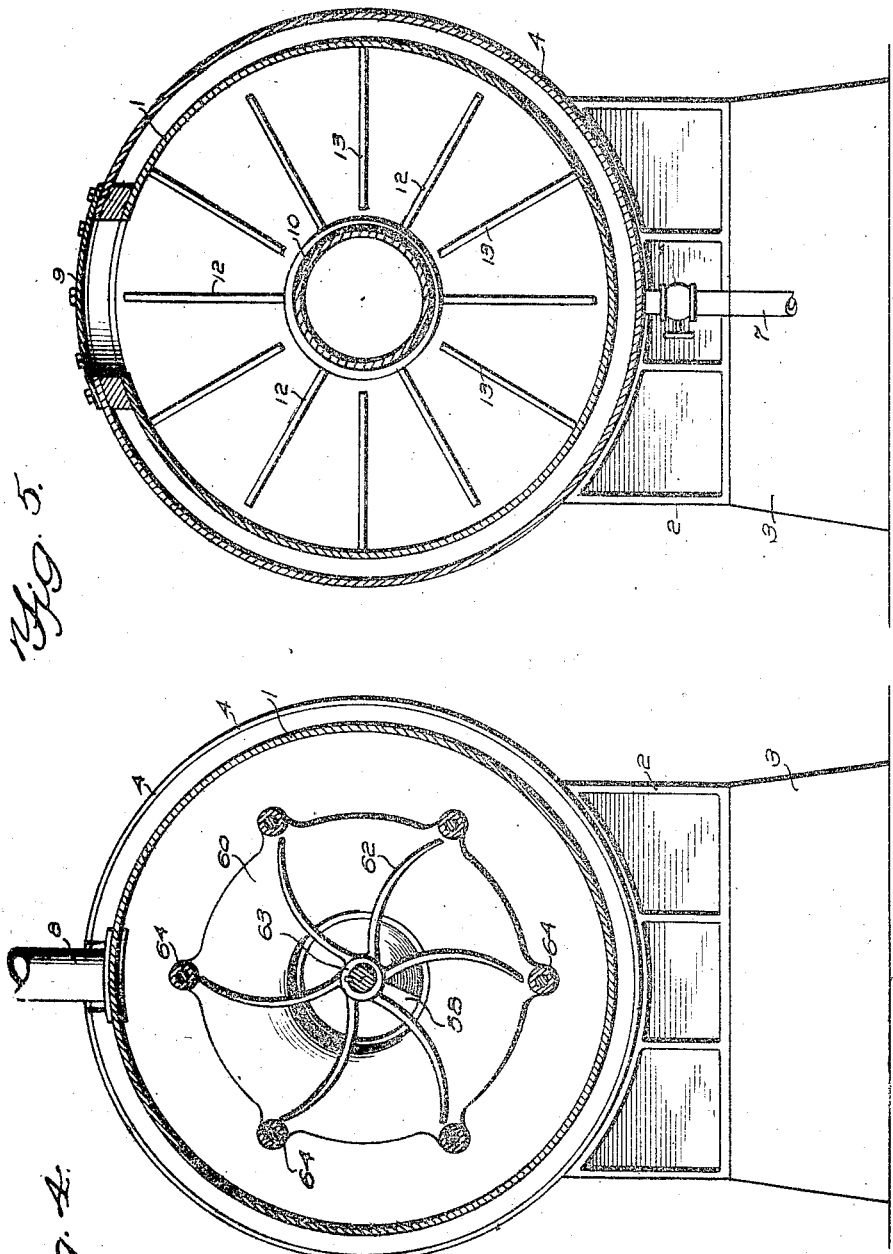

Sept. 25, 1923.
J. C. SILVESTER
FILTERING APPARATUS
1,469,026
Filed Jan. 13, 1921     4 Sheets-Sheet 4
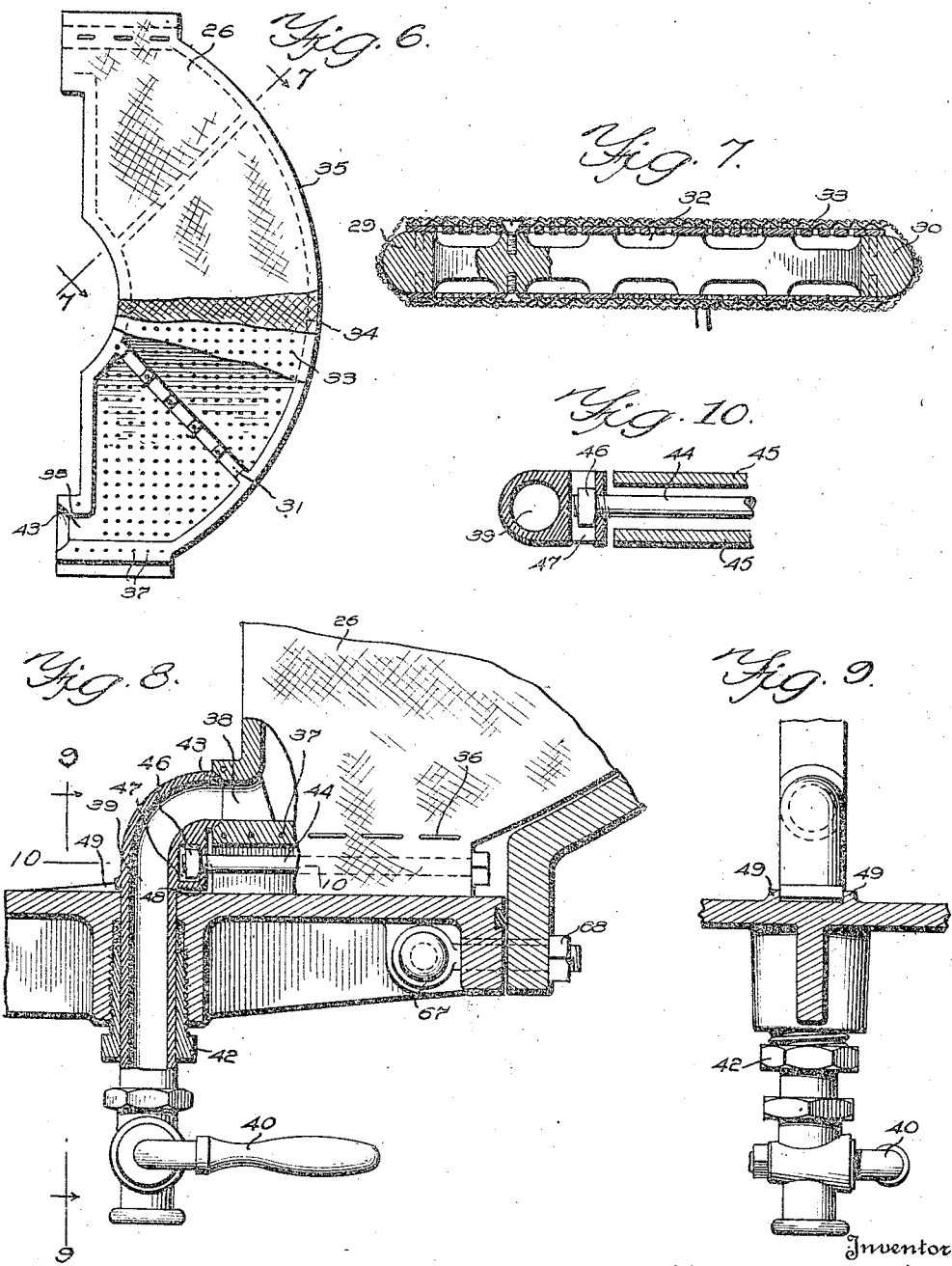
Inventor
John C. Silvester Patented Sept. 25, 1923.

1,469,026

UNITED STATES PATENT OFFICE.

JOHN C. SILVESTER, OF PHILADELPHIA, PENNSYLVANIA.

FILTERING APPARATUS.

Application filed January 13, 1921. Serial No. 437,000.

*To all whom it may concern:*

Be it known that I, JOHN C. SILVESTER, formerly a subject of the Emperor of Germany (who has declared his intention of becoming a citizen of the United States), residing at Philadelphia, in the county of Philadelphia and State of Pennsylvania, have invented certain new and useful Improvements in Filtering Apparatus, of which the following is a specification.

This invention relates to filtering and decolorizing apparatus, and it comprises a mixing chamber wherein a solution to be treated and decolorizing carbon, or other material, may be agitated and mixed, a filtering chamber to remove the carbon and solid impurities from the solution, means for collecting said solid material, and means for returning it to the mixing chamber.

In the present invention, I have provided an apparatus particularly suitable for decolorizing and filtering sugar solutions, but also capable of use in the purification of other solutions, wherein decolorizing carbon, or other material with which the solution is to be treated is thoroughly mixed therewith in a drum or mixing chamber which is provided with revolving mechanism to agitate the material in the drum and cause thorough mixture of the carbon in the solution. From the mixing chamber, the material is delivered to a filter chamber, wherein a plurality of spaced filtering elements are provided and the liquid is adapted to pass through the outer surface of the filtering elements whence it is conveyed to a suitable source of collection and disposal. The carbon and solid impurities originally present in the solution remain on the surface of the filtering elements, and I provide mechanism in the form of revolving scrapers or buckets which are arranged to remove the solid matter from the outside of the filtering elements. The carbon and solid material is then returned to the mixing chamber through the shaft of the drum, which is hollow, and means are provided for discharging the solid matter outwardly into the drum, whereby it is thoroughly mixed in the solution.

In treating some solutions, it is advisable to provide means for heating the material to be treated during the treating operation, and for this purpose, the drum or mixing chamber may be steam jacketed, or provided with other means whereby the temperature may be regulated.

In the accompanying drawings, I have shown one embodiment of the invention. In this showing:

Figure 1:
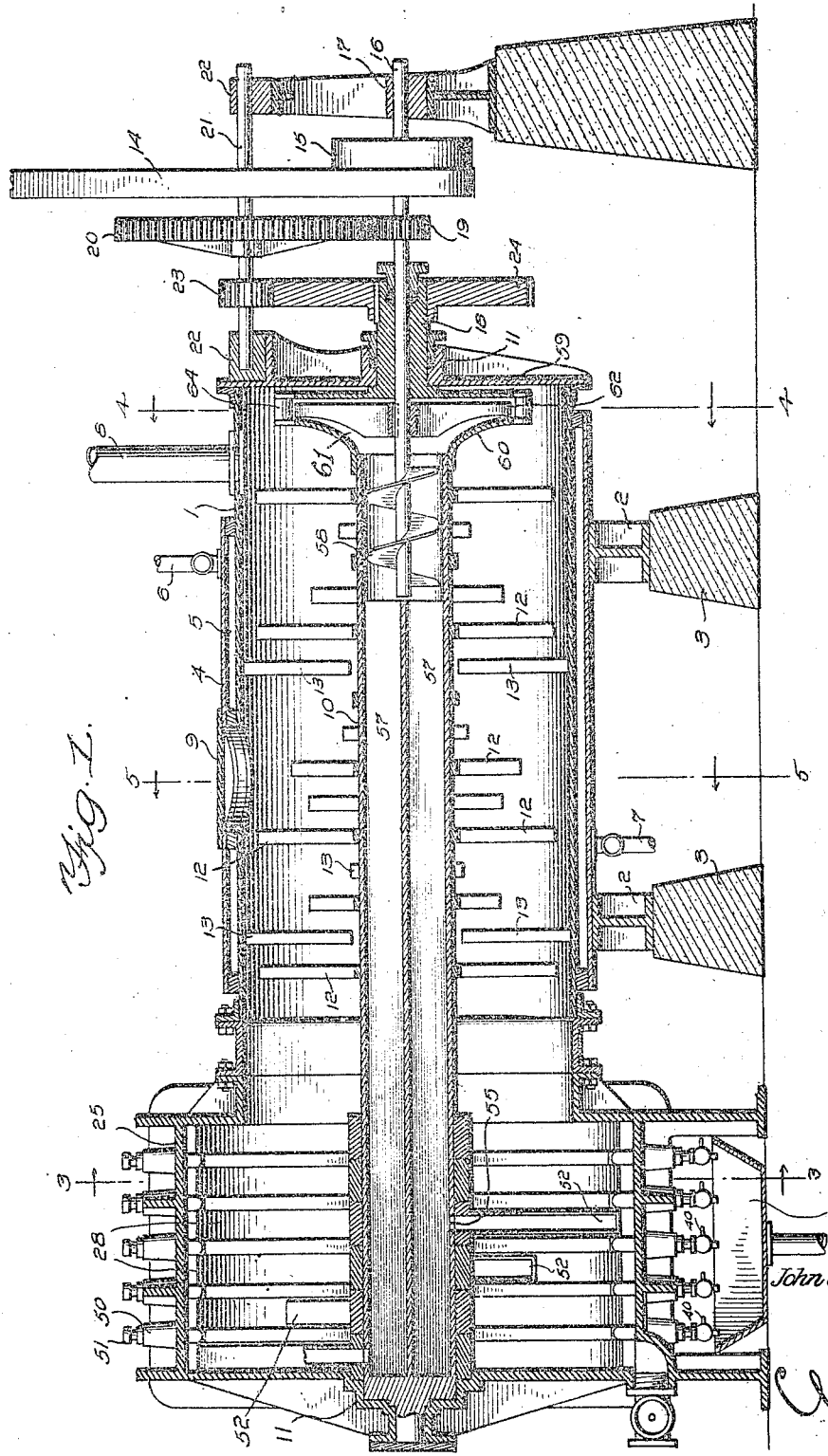
Figure 1 is a vertical central longitudinal sectional view of the apparatus.
Figure 2:
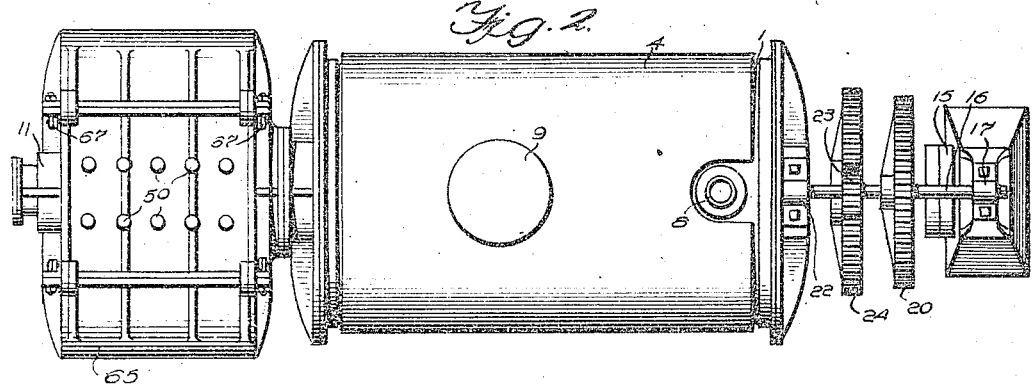
Figure 2 is a plan view.
Figure 3:
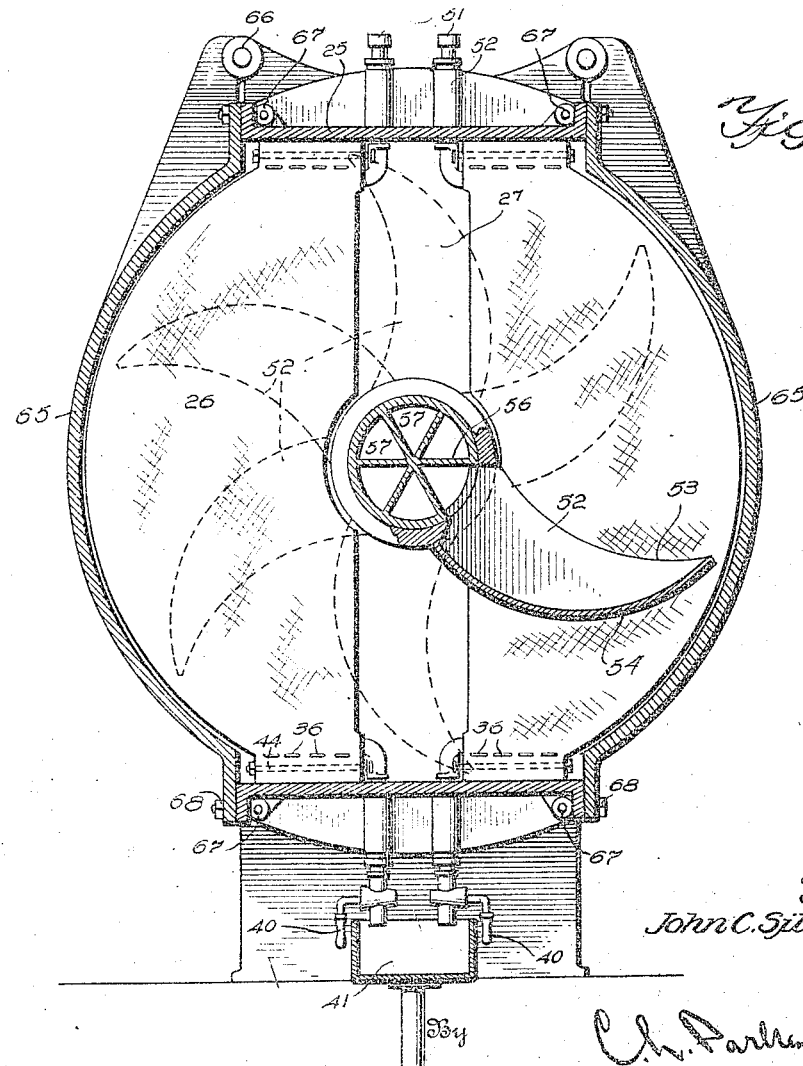

Figure 3 is a transverse sectional view of the filtering chamber, taken on line 3—3 of Figure 1, Figure 4 is a sectional view on line 4—4 of Figure 1, Figure 5 is a transverse sectional view on line 5—5 of Figure 1, Figure 6 is a detail view of one of the filtering elements, parts being shown in section, Figure 7 is a sectional view on line 7—7 of Figure 6, Figure 8 is a detail view showing means for retaining the filtering elements in position, Figure 9 is a sectional view on line 9—9 of Figure 8, and, Figure 10 is a similar view on line 10—10 of Figure 8.

Referring to the drawings, the reference numeral 1 designates a drum or casing which forms the mixing chamber. The drum may be supported in any suitable manner, as by brackets 2, arranged on supports or foundations 3. If desired, the outer wall 4 may be arranged around the drum forming a heating or cooling space 5. Heating or cooling liquids may be passed into this space through inlet 6, and exhausted through outlet 7. The drum is provided with an inlet 8 for the solution to be treated and with an opening covered by a man hole cover 9, for the admission of carbon or other material for treating the solution. A revolving shaft 10 is arranged in the center of the drum, the shaft being mounted in suitable bearings 11 at each end. This shaft is provided with blades 12, and the drum is provided with similar alternately disposed plates 13, for agitating and mixing the carbon or other material with the solution.

The shaft 10 is driven from a suitable source of power by means of a belt 14, passing over a pulley 15, arranged on a shaft 16, supported in suitable bearings 17 and 18. The bearing 18 is carried by the shaft 10, as shown. A pinion 19, on the shaft 16 meshes with a gear 20, on stub shaft 21. The stub shaft is mounted in suitable bearings 22, arranged on the frame of the machine, and this shaft is provided with a pinion 23, meshing with a gear 24, carried by the hub of the shaft 10. It will be apparent that the shaft 10 is revolved at a less speed than the shaft 16.

The filtering chamber 25 is arranged adjacent the mixing chamber or drum, and is in communication therewith, the end of the drum being open. A plurality of filtering elements 26 are arranged within the filtering chamber, each of the filtering elements being slightly less than half the size of the filtering chamber, whereby a central longitudinal opening 27 is provided for the passage of the material being treated (see Figure 3). As stated, the filtering elements are spaced from each other, to provide intervening spaces 28 into which the solution flows from the longitudinal space 27.

Each of the filtering elements comprises a frame having end members 29 and 30, one of which is curved to conform to the outline of the filtering chamber. Suitable spacing members 31 are arranged between the end members, and these members are provided with recesses 32 to permit flow of the solution within the filtering chambers. A perforated plate 33 is arranged on each side of the filtering frame, and this plate is provided with a covering 34, of wire mesh, or other suitable material. An outer covering 35 of filtering cloth is arranged over the wire mesh. The wire mesh and the perforated plate are secured to the frame in any suitable manner. The outer covering of filter cloth extends entirely around the frame (see Figure 7) and is secured thereto by means of a wire 36 passing through openings 37 in the end walls of the frame.

The filtering frames are each provided with outlet openings 38 communicating with drain pipes 39, extending through openings in the filtering frame and provided with valves 40. A collecting trough 41 is arranged below these outlets. Suitable packing glands 42 may be arranged around the outlet pipes. As shown, the outlets 38 of the filtering frames are provided with substantially spherical sockets 43, for the reception of the ends of the drain pipes which are curved to fit the sockets. The filtering frame is supported within the filtering chamber by means of bolts 44, arranged between the lower walls 45 of the frame and adapted to be received by nuts 46, arranged in recesses 47, of enlargements 48, formed on the drain pipes. Suitable lugs or projections 49 on the base of the filtering chamber serve to retain the drain pipes in proper position, and the frames are retained in position by tightening the bolts 44. The inner face of the nut 46 is rounded, whereby slight adjustment of the end of the drain pipe may be secured to insure proper fit within the socket 43. The top of the filtering frames are held in place by members 50, similar in construction to the drain pipes, but provided with closure caps 51.

Within the filtering chamber, there is provided a plurality of scrapers or buckets 52, secured to the shaft 10, and extending outwardly to a point near the wall of the chamber. One of these buckets is arranged in each of the spaces 28, and the side walls 53 of the bucket are adapted to remove carbon and other solid matter from the faces of the filtering frame. The buckets are provided with bottoms 54, and as the buckets revolve, the carbon or other solid material collected, is delivered to the interior of the shaft 10 through openings 55. The shaft may be provided with a plurality of cross plates 56 dividing the space into a plurality of chambers 57 corresponding in number to the buckets 52. At the other end of the shaft, a worm conveyor 58 is arranged on the shaft 16 within the hollow shaft 10. The end of the shaft 10 is provided with a circular plate 59, and a curved plate 60, spaced therefrom providing a chamber 61. A plurality of radial blades 62 are arranged within this space supported on a hub 63 keyed to the shaft 16. The chamber 61 is provided with a circumferential outlet 64.

The side walls 65 of the filtering chambers may be hinged to the top, as at 66, and secured in position by means of hinged bolts 67, arranged at the top and bottom of the filtering chamber and received in slots (not shown) in the side walls. The bolts are provided with nuts 68, to retain the side walls in position.

In operation, the sugar solution, or other material to be treated is continuously admitted to the drum 1 through inlet pipe 8. When the treatment is such that heat is desired, steam may be admitted to the jacket 5 through pipe 6, and exhausted through pipe 7. Similarly, a cooling fluid may be passed through the jacket when desired. The desired amount of carbon, or other material is first placed in the drum by removing the man hole 9. After the carbon has been placed in the drum, and the cover replaced, the shaft 10 is revolved at a slow rate of speed and the carbon or other material is thoroughly admixed in the solution by means of the blades 12 and 13. From the mixing drum, the material being treated flows into the filtering chamber and passes to the spaces 28 between the filtering frames through the longitudinal space 27. From the longitudinal spaces the liquid passes into the filtering frames, the carbon and other solid impurities being deposited on the filtering cloth. The decolorized and filtered liquid is then collected through the drain outlets 39 in the collecting receptacle 41, and disposed of in any suitable manner. The revolution of the shaft 10 causes the buckets 52 to continually scrape the walls of the filtering frames, the carbon and other solid matter collected passing into the spaces 57, through openings 55. This material is returned to the mixing drum by the worm conveyor 58 and is delivered outwardly by the radial blades 62, through outlet opening 64. The provision of the radial blade 62 assists in thorough intermixture of the returned carbon with the solution in the mixing chamber. The shaft 16, worm conveyor 58, and radial blades 62 are revolved at a relatively high rate of speed to insure return of the carbon from the buckets 52 to the mixing chamber.

At suitable intervals, the filtering chamber may be cleaned by closing valves 40, removing caps 51 from the members 50, and forcing water through the filtering frames in a reverse direction. Any solid matter adhering to the walls of the filtering frames, and not removed by the buckets 52 will thus be washed off.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A filtering apparatus comprising a filtering chamber having an inlet, a plurality of filtering frames arranged transversely of said filtering chamber and spaced from each other, said chamber being provided with a longitudinally extending passage between said frames to permit flow of liquid into the spaces between said frames, means for collecting liquid passing through said frames, means for collecting solid material from said frames, and means cooperating with said solid material collecting means for returning solid material to said inlet.

2. An apparatus of the character described comprising a filtering chamber having an inlet, a hollow shaft extending through said chamber, a plurality of filtering frames arranged in said filtering chamber and spaced from each other, means for collecting liquids passing through said frames, and means for removing solid material from the outside of said frames and delivering it into said shaft.

3. An apparatus of the character described comprising a filtering chamber, a hollow shaft extending through said chamber, a plurality of filtering frames arranged in said chamber and spaced from each other, said frames being provided with outlets extending to the exterior of said chamber, and means for removing solid material from the outside of said frames and delivering it into said shaft.

4. An apparatus of the character described comprising a filtering chamber, a hollow shaft extending through said chamber, means for introducing materials into said chamber, a plurality of filtering frames arranged transversely of said filtering chamber and spaced from each other, a plurality of buckets carried by said shaft and arranged in the spaces between said filtering frames, said buckets being adapted to scrape the sides of said frames to remove solids therefrom, means for collecting liquids passing through said frames, and means for delivering solid material from said buckets into said shaft.

5. An apparatus of the character described comprising a filtering chamber, a plurality of filtering frames arranged transversely of said filtering chamber and spaced from each other, said chamber being provided with a longitudinally extending passage between said frames to permit flow of liquid into the spaces between said frames, a plurality of revolving buckets mounted in said chamber and arranged between said filtering frames, said buckets being adapted to scrape the sides of said frames to remove solids therefrom, and means for collecting liquids passing through said frames.

6. A filtering apparatus comprising a filtering chamber having an inlet, a pair of filtering frames arranged transversely of said chamber and spaced from each other, means for collecting liquids passing into said frames, a hollow rotatable shaft extending into said chamber, and a bucket carried by said shaft, said bucket having side walls arranged adjacent the inner walls of said filtering frames to scrape solid material therefrom, said shaft being provided with an opening communicating between said bucket and the interior of said shaft.

7. A filtering apparatus comprising a filtering chamber having an inlet, a plurality of substantially semi-circular filtering frames arranged oppositely in pairs within said chamber, said pairs of frames being spaced from each other, a hollow rotatable shaft extending into said chamber between said pairs of frames, arcuate buckets arranged in the spaces between the pairs of filtering frames and connected with said shaft, said shaft being provided with a plurality of openings communicating between said buckets and the interior of said shaft, an outlet pipe communicating with each of said filtering frames, and means for detachably connecting said frames to said outlet pipes.

8. An apparatus of the character described comprising a filtering chamber having an inlet, a hollow shaft extending into said chamber, a plurality of filtering frames arranged in said chamber and spaced from each other, means for removing solid material from the outside of said frames and delivering it into said shaft, an outlet pipe communicating with each of said filtering frames, and means for detachably connecting said frames to said outlet pipes.

In testimony whereof I affix my signature in presence of two witneses.

JOHN C. SILVESTER.

Witnesses:
C. JULES GRAF,
ERNEST BECKER.